(12) United States Patent
Kataoka

(10) Patent No.: US 7,061,744 B2
(45) Date of Patent: Jun. 13, 2006

(54) ELECTROSTATIC BREAKDOWN PREVENTION APPARATUS FOR ELECTRONIC APPARATUS

(75) Inventor: Kenji Kataoka, Tokyo (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 09/840,142

(22) Filed: Apr. 24, 2001

(65) Prior Publication Data

US 2001/0036051 A1 Nov. 1, 2001

(30) Foreign Application Priority Data

Apr. 28, 2000 (JP) .................. 2000-128883

(51) Int. Cl.
*H02H 1/04* (2006.01)

(52) U.S. Cl. .................................. 361/212
(58) Field of Classification Search ............ 361/212, 361/58; 439/924.1, 188; 200/51.1
See application file for complete search history.

(56) References Cited

U.S. PATENT DOCUMENTS

| | | | | |
|---|---|---|---|---|
| 4,882,554 A | * | 11/1989 | Akaba et al. | 333/105 |
| 5,155,648 A | * | 10/1992 | Gauthier | 361/58 |
| 5,164,880 A | * | 11/1992 | Cronin | 361/220 |
| 5,556,290 A | * | 9/1996 | Northey et al. | 439/188 |
| 5,619,076 A | * | 4/1997 | Layden et al. | 307/48 |
| 5,659,888 A | * | 8/1997 | Kato et al. | 455/575 |
| 6,355,991 B1 | * | 3/2002 | Golf et al. | 307/140 |

FOREIGN PATENT DOCUMENTS

| | | |
|---|---|---|
| JP | 60-62076 | 4/1985 |
| JP | 62-23078 | 2/1987 |
| JP | 3-184410 | 8/1991 |
| JP | 3-187168 | 8/1991 |
| JP | 6-21173 | 3/1994 |
| JP | 8-243084 | 9/1996 |
| WO | 95/05692 | 2/1995 |
| WO | 99/35742 | 7/1999 |

* cited by examiner

*Primary Examiner*—Brian Sircus
*Assistant Examiner*—Z Kitov
(74) *Attorney, Agent, or Firm*—Young & Thompson

(57) ABSTRACT

An electrostatic breakdown prevention apparatus is disclosed which allows an electronic apparatus connected to a connector to bidirectionally transfer data at a high speed on the same signal line and prevents an electrostatic breakdown of the electronic apparatus without relying upon the structure of the connector. A signal line on an electronic apparatus body side is provided with an electrostatic breakdown preventing smoothing circuit for smoothing a signal inputted to the signal line. A connector for connection of the signal line is provided with a switching mechanism for stopping the smoothing function of the electrostatic breakdown preventing smoothing circuit when the connector is connected, but restoring the smoothing function of the electrostatic breakdown preventing smoothing circuit when the connector is disconnected.

1 Claim, 2 Drawing Sheets

US 7,061,744 B2

ELECTROSTATIC BREAKDOWN PREVENTION APPARATUS FOR ELECTRONIC APPARATUS

BACKGROUND OF THE INVENTION

1. Field of the Invention

The present invention relates to an electrostatic breakdown prevention apparatus for an electronic apparatus, and more particularly to an electrostatic breakdown apparatus suitable for use with an electronic apparatus which is used frequently outdoors or at a like place where the electronic apparatus is likely to be influenced by static electricity.

2. Description of the Related Art

An electronic apparatus, particularly a portable electronic apparatus that is connected to an external apparatus through a connector and bidirectionally transfers data at a high speed to or from the external apparatus using the same signal line is conventionally known.

A connector of a portable apparatus to an external apparatus includes, at signal inputting and outputting portions thereof, an electric circuit for smoothing a high voltage applied momentarily thereto to prevent a breakdown of an internal electric circuit by static electricity as a countermeasure to allow the portable apparatus to be used frequently outdoors or at a like place.

However, increase of the speed of data transfer of such portable apparatus has been and is proceeding in recent years, and such a smoothing circuit as described above makes an obstacle to high speed data transfer. Therefore, it is demanded to realize both of prevention of static electricity and high speed data transfer.

Also it is demanded to reduce the number of connection lines of a connector involved in miniaturization of a portable apparatus and to achieve bidirectional data transfer on the same line.

In order to satisfy such demands as described above, a connector has been proposed in Japanese Patent Laid-Open No. 062076/1985 wherein, when the connector is not in a non-connecting state, a connector terminal unit structure itself is grounded in order to prevent an electrostatic breakdown. However, when the connector is placed into a connecting state, the connector terminal unit structure is brought into a non-grounded state.

The apparatus disclosed in the prior art document mentioned above cannot be configured so as to prevent an electrostatic breakdown of a pair of apparatus connected to the opposite sides of the connector where one of the two apparatus transfers a signal bidirectionally using the same signal line of the connector.

Further, for portable apparatus, the shape of a connector unit which can be used is sometimes prescribed in specifications of an interface to be used. In this instance, the apparatus disclosed in the prior art cannot be applied.

SUMMARY OF THE INVENTION

It is an object of the present invention to provide an electrostatic breakdown prevention apparatus which allows an electronic apparatus connected to a connector to bidirectionally transfer data at a high speed on the same signal line and prevents an electrostatic breakdown of the electronic apparatus without relying upon the structure of the connector.

In order to attain the object described above, according to the present invention, there is provided an electrostatic breakdown prevention apparatus for an electronic apparatus which includes a connector for connecting and disconnecting, between an electronic apparatus body and an external apparatus, a signal line used for bidirectional data transfer between the electronic apparatus body and the external apparatus, comprising an electrostatic breakdown preventing smoothing circuit provided for the signal line on the electronic apparatus body side with respect to the connector for smoothing a signal inputted to the signal line, and a switching mechanism provided on the connector for stopping the smoothing function of the electrostatic breakdown preventing smoothing circuit when the connector is connected, but restoring the smoothing function of the electrostatic breakdown preventing smoothing circuit when the connector is disconnected.

Preferably, the electrostatic breakdown preventing smoothing circuit is provided also for the signal line on the external apparatus side. In this instance, preferably the switching mechanism simultaneously switches the electrostatic breakdown preventing smoothing circuit provided on the electronic apparatus body side and the electrostatic breakdown smoothing circuit provided on the external apparatus side.

The electrostatic breakdown preventing smoothing circuit includes a resistor connected to the signal line, a grounding line connected to the signal line, and a capacitor interposed in the grounding line, and the switching mechanism may be provided for the grounding line and switches the capacitor between a grounded state and a non-grounded state.

The switching mechanism may include a movable member provided for sliding movement on a first one of connector elements of the connector for which the electrostatic breakdown preventing smoothing circuit is provided and including a movable contact for being contacted with the grounding line to place the grounding line into a connected state, a biasing member for biasing the movable member in a direction in which the movable contact is brought into contact with the grounding line, and a pressing member provided on a second one of the connector elements for fitting with the first connector element for moving, when the first and second connector elements are connected to each other, the movable member against a biasing force of the biasing member to bring the movable contact provided on the movable member out of contact with the grounding line.

Alternatively, the switching mechanism may include a lead switch provided on a first one of connector elements of the connector for which the electrostatic breakdown preventing smoothing circuit is provided, and a magnet provided on a second one of the other connector elements for connection to a second one of the connector elements for fitting with the first connector element for rendering, when the first and second connector elements are connected to each other,the lead switch operative to connect the grounding line.

A plurality of signal lines may be provided.

The electronic apparatus may be a portable apparatus.

With the electrostatic breakdown prevention apparatus for an electronic apparatus, if static electricity enters the electronic apparatus in a state wherein an external apparatus is not connected to the electronic apparatus, then the waveform of the static electricity is smoothed, and consequently, application of a high voltage to the electronic apparatus is prevented. As a result, an otherwise possible breakdown of the electronic apparatus can be prevented.

Further, since an electronic circuit, i.e., the electrostatic breakdown preventing smoothing circuit, achieves the smoothing of the waveform of the static electricity, the electrostatic breakdown prevention apparatus can be incorporated into the electronic apparatus easily. Thus, the electrostatic breakdown prevention apparatus can be applied simply and conveniently to an electronic apparatus which performs bidirectional data transfer by means of the same signal line. Further, such incorporation of the electronic breakdown prevention apparatus into an electronic apparatus can be performed without having an influence on the configuration of the connector which connects the apparatus, and also application to an electronic apparatus into which a connector is designed to be incorporated is easy.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
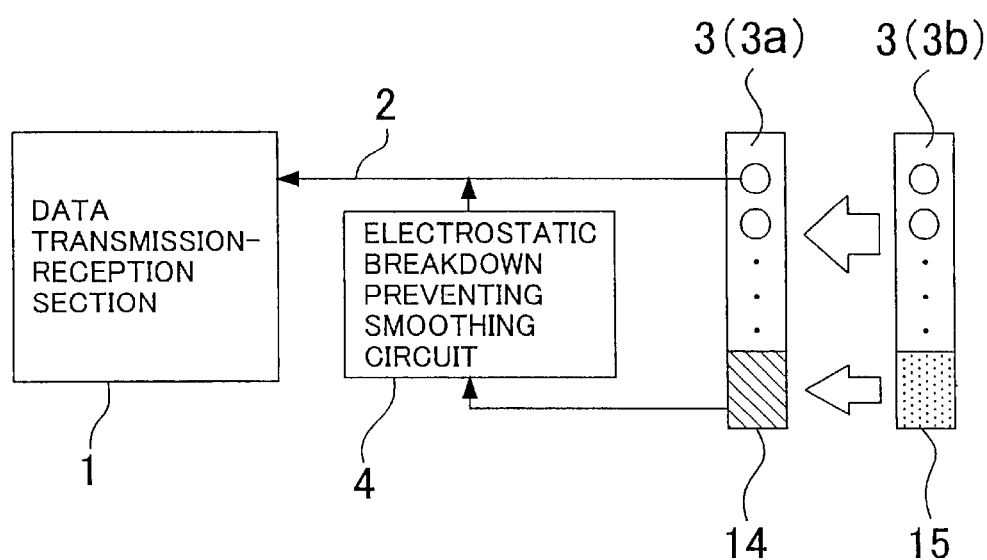
FIG. 1 is a schematic block diagram showing an electrostatic breakdown prevention apparatus to which the present invention is applied.
Figure 2:
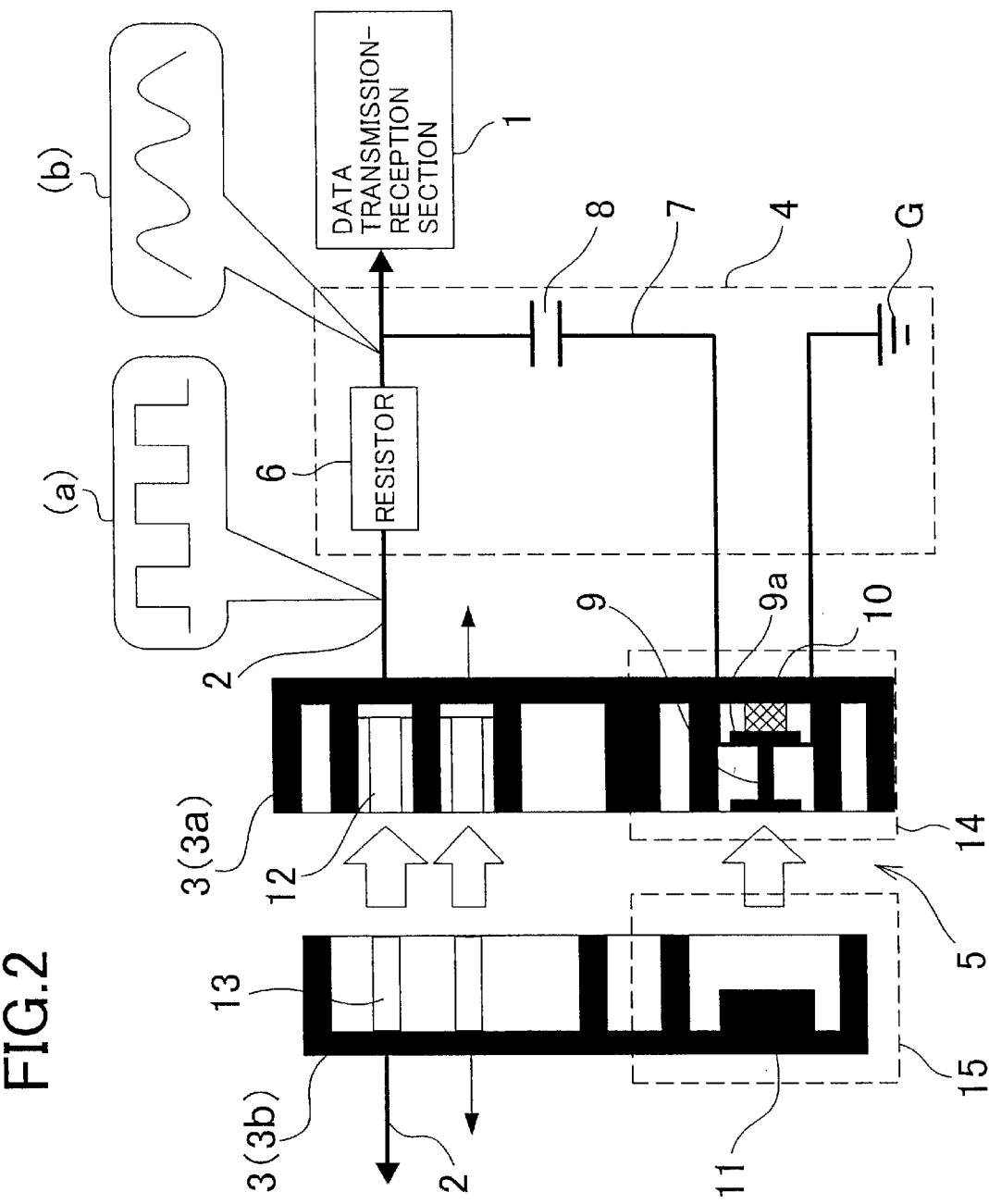
FIG. 2 is an enlarged cross sectional and diagrammatic view showing the electrostatic breakdown prevention apparatus of FIG. 1.

Referring to FIGS. 1 and 2, there is shown an electrostatic breakdown prevention apparatus for an electronic apparatus to which the present is applied. Referring first to FIG. 1, the electrostatic breakdown prevention apparatus includes a connector 3 including first and second connector elements 3a and 3b for connecting and disconnecting, between an electronic apparatus body (not shown) and an external apparatus (not shown), a signal line 2 used for bidirectional data transfer between a data transmission-reception section 1 provided on the electronic apparatus body and the external apparatus. At least on the electronic apparatus body side, the signal line 2 has an electrostatic breakdown preventing smoothing circuit 4 for smoothing a signal inputted to the signal line 2. The connector 3 includes a switching mechanism 5 for stopping the smoothing function of the electrostatic breakdown preventing smoothing circuit 4 when the connector 3 is connected, that is, when the connector elements 3a and 3b are fitted with and connected to each other, but restoring the smoothing function of the electrostatic breakdown preventing smoothing circuit 4 when the connector 3 is disconnected.

Referring now to FIG. 2, the electrostatic breakdown preventing smoothing circuit 4 includes a resistor 6 connected to the signal line 2, a grounding line 7 for connecting the signal line 2 to the ground G, and a capacitor 8 interposed in the grounding line 7. The switching mechanism 5 is provided on the grounding line 7 and switches the capacitor 8 between a grounded state and a non-grounded state.

The switching mechanism 5 includes a movable member 9 provided for sliding movement on the first connector element 3a of the connector 3 on which the electrostatic breakdown preventing smoothing circuit 4. The movable member 9 has a movable contact 9a for being contacted with the grounding line 7 to place the grounding line 7 into a connected state. A biasing member 10 biases the movable member 9a in a direction in which the movable contact 9a is brought into contact with the grounding line 7. A pressing member 11 is provided on the second connector element 3b to be fitted with the first connector element 3a and moves, when the connector elements 3a and 3b are moved toward each other so as to be connected to each other, the movable member 9 against a biasing force of the biasing member 10 to bring the movable contact 9a provided on the movable member 9 out of contact with the grounding line 7 to disconnect the grounding line 7.

The first and second connector elements 3a and 3b include connecting terminals 12 and 13 connected to the signal line 2, respectively. The first and second connecting terminals 12 and 13 are brought into contact with and electrically connected to each other when the connector elements 3a and 3b are fitted with and connected to each other. Consequently, the electronic apparatus and the external apparatus not shown are connected to each other through the signal line 2.

The first connector element 3a has an insertion detection section 14 on which the movable member 9 is mounted for sliding movement. An insertion portion 15 is provided on the second connector element 3b, and the pressing member 14 is integrally provided on and protects from the insertion portion 15.

On the insertion detection section 14, the grounding line 7 is cut midway and the cut portions are held in a spaced relationship by a predetermined distance from each other such that they are opposed to the movable contact 9a provided on the movable member 9.

The electrostatic breakdown prevention apparatus for an electronic apparatus according to the present embodiment having such a configuration as described above is used in a state wherein the connector 3 is disconnected when the electronic apparatus by itself is used.

When the connector 3 is disconnected in this manner, since the movable member 9 of the switching mechanism 5 is acted upon by the biasing force of the biasing member 10, the movable contact 9a provided on the movable member 9 is pressed against the cut portions of the grounding line 7 to electrically connect the cut portions to each other to hold the grounding line 7 in a conducting state in which the capacitor 8 is electrically connected to the ground G.

Here, if static electricity having such a waveform as shown in (a) of FIG. 2 enters the electrostatic breakdown preventing smoothing circuit 4 through the signal line 2, then the waveform of the entering static electricity is smoothed in such a manner as shown in (b) of FIG. 2 by an action of the resistor 6 and the capacitor 8. As a result, a high voltage is prevented from being applied to the data transmission-reception section 1 which requires protection against a high voltage. Consequently, an otherwise possible breakdown of the data transmission-reception section 1 is prevented.

On the other hand, when the electronic apparatus is to be connected to an external apparatus to transmit or receive data to or from the external apparatus, the first and second connector elements 3a and 3b are fitted with and connected to each other.

When the connector elements 3a and 3b are fitted with each other in this manner, the opposite portions of the signal line 2 with respect to the connector 3 are connected to each other through the connecting terminals 12 and 13. Further, when the connector elements 3a and 3b are moved toward and fitted with each other, the movable member 9 is moved against the biasing force of the biasing member 10 by the pressing member 11. Thereupon, the movable contact 9a of the movable member 9 is brought out of contact with the cut portions of the grounding line 7, and consequently, the conduction of the grounding line 7 is interrupted midway and the capacitors is disconnected from the ground G.

In this state, if an ordinary data signal is inputted to the electrostatic breakdown preventing smoothing circuit 4, then the data signal is inputted to the data transmission-reception section 1 only through the resistor 6. Consequently, the waveform of the data signal is not smoothed. Therefore, high speed data communication is allowed.

Since entering of a high voltage into the data transmission-reception section 1 is prevented by the electrostatic breakdown preventing circuit 4 formed from an electric circuit as recognized from the present embodiment, the data transmission-reception section 1 can be incorporated readily into the electronic apparatus. Also where a plurality of such electrostatic breakdown preventing circuits 4 are provided, they can be switched simultaneously by the single switching mechanism 5.

Accordingly, the electrostatic breakdown preventing smoothing circuit 4 can be provided additionally on the second connector element 3b side. This makes it possible to apply the electrostatic breakdown prevention apparatus of the present invention also to an apparatus which need perform bidirectional high speed data transmission/reception.

Also where a plurality of such signal lines 2 as described above are provided, it is possible to provide the electrostatic breakdown preventing circuit 4 for each of the signal lines 2 so as to provide an electrostatic breakdown prevention function to each of the signal lines 2.

Also it is possible to form the switching mechanism 5 from a lead switch and a magnet for switching the lead switch on and off. Accordingly, since the switching mechanism 5 can be provided without having an influence on the structure of the connector 3, it can be applied readily also to an apparatus in which it is designed to incorporate the connector 3.

While a preferred embodiment of the present invention has been described using specific terms, such description is for illustrative purposes only, and it is to be understood that changes and variations may be made without departing from the spirit or scope of the following claims.

What is claimed is:

1. An electrostatic breakdown prevention apparatus between an electronic apparatus body of an electronic apparatus and an external apparatus connected to said electronic apparatus, comprising:

a first connector element having a connecting terminal connected to a signal line of said electronic apparatus body;

a second connector element having a connecting terminal connected to a signal line of said external apparatus;

an electrostatic breakdown preventing capacitor provided on said electronic apparatus body; and a grounding line connected to said capacitor for grounding said capacitor; said grounding line being cute into a first grounding line portion extending from said capacitor to said first connector element and a second grounding line portion extending from said first connector element to the ground;

said first connector element including a movable member having a movable contact thereon and a biasing member for biasing said movable member to establish an electrical connection between said first grounding line portion and said second grounding line portion through said movable member;

said second connector element including a pressing member provided thereon for moving said movable member against said biasing member;

said first and second connector elements being arranged to fit with each other, whereupon the connecting terminals therof contact with each other to establish an electrical connection between the signal line of said electronic apparatus body and the signal line of said external apparatus and said pressing member moves said movable member against said biasing member to cut the electrical connection between said first and second grounding line portions through said movable member.

* * * * *